United States Patent
Yoshigaki

(10) Patent No.: US 10,996,389 B2
(45) Date of Patent: May 4, 2021

(54) PLANAR LIGHTING DEVICE

(71) Applicant: MINEBEA MITSUMI Inc., Nagano (JP)

(72) Inventor: Nobuhiko Yoshigaki, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/570,116

(22) Filed: Sep. 13, 2019

(65) Prior Publication Data

US 2020/0088930 A1 Mar. 19, 2020

(30) Foreign Application Priority Data

Sep. 19, 2018 (JP) .............................. JP2018-174511

(51) Int. Cl.
*F21V 8/00* (2006.01)

(52) U.S. Cl.
CPC ......... *G02B 6/0023* (2013.01); *G02B 6/0055* (2013.01); *G02B 6/0083* (2013.01); *G02B 6/0088* (2013.01); *G02B 6/0091* (2013.01)

(58) Field of Classification Search
CPC ........................... G02B 6/0023; G02B 6/0088
See application file for complete search history.

(56) References Cited

U.S. PATENT DOCUMENTS

| | | |
|---|---|---|
| 5,786,665 A | 7/1998 | Ohtsuki et al. |
| 6,036,328 A | 3/2000 | Ohtsuki et al. |
| 6,415,531 B1 | 7/2002 | Ohtsuki et al. |
| 10,267,976 B1* | 4/2019 | Zheng ................. G02B 6/0045 |
| 2006/0203515 A1 | 9/2006 | Fujikawa et al. |
| 2009/0273947 A1 | 11/2009 | Takada |
| 2011/0149595 A1* | 6/2011 | Lin ....................... G02B 6/0036 |
| | | 362/606 |

(Continued)

FOREIGN PATENT DOCUMENTS

| CN | 1831613 A | 9/2006 |
|---|---|---|
| CN | 101183194 A | 5/2008 |

(Continued)

OTHER PUBLICATIONS

Notice of Reasons for Refusal dated Aug. 27, 2020 for corresponding Japanese Application No. 2018-174511 and English translation.

(Continued)

*Primary Examiner* — Evan P Dzierzynski
(74) *Attorney, Agent, or Firm* — Pearne & Gordon LLP

(57) ABSTRACT

A planar lighting device according to an embodiment has a light source, a light guide plate, and a light shielding sheet. The light guide plate has an light-incident surface on one edge surface and a light-emitting surface on one main surface. The light guide plate emits light, which is emitted by the light source and entered from the light-incident surface, from the light-emitting surface. The light guide plate further has a plurality of through-holes that are spaced apart from each other in a direction intersecting a direction in which light emitted by the light source enters into the light-incident surface. The through-holes pass through the light guide plate in a thickness direction. The light shielding sheet is disposed so as to cover a portion on the light-emitting surface between adjacent through-holes.

7 Claims, 4 Drawing Sheets

(56) References Cited

U.S. PATENT DOCUMENTS

| | | | |
|---|---|---|---|
| 2012/0020055 A1 | 1/2012 | Ligas et al. | |
| 2017/0059771 A1* | 3/2017 | Yuki | G02B 6/0088 |
| 2017/0123140 A1* | 5/2017 | Han | G02B 6/0045 |
| 2019/0072822 A1* | 3/2019 | Yasunaga | G02B 6/0035 |
| 2020/0064541 A1* | 2/2020 | Jeon | G02B 6/0088 |

FOREIGN PATENT DOCUMENTS

| | | |
|---|---|---|
| CN | 106461173 A | 2/2017 |
| CN | 108427228 A | 8/2018 |
| JP | 08-315621 A | 11/1996 |
| JP | 2006-294256 A | 10/2006 |
| JP | 2015-195110 A | 11/2015 |
| TW | 201122574 A | 7/2011 |
| WO | 2015/178299 A1 | 11/2015 |

OTHER PUBLICATIONS

Decision to Grant A Patent dated Oct. 16, 2020 for corresponding Japanese Application No. 2018-174511 and English translation.
First Office Action dated Feb. 26, 2021 for corresponding Chinese Application No. 201910720468.0 and English translation.

* cited by examiner

| | MEAN BRIGHTNESS [a.u] | HOLE-REAR-SIDE BRIGHTNESS [%] |
|---|---|---|
| FIRST EXAMPLE | 119.9 | 103.1% |
| SECOND EXAMPLE | 106.4 | 95.3% |
| EXAMPLE | 100 | 78.3% |

PLANAR LIGHTING DEVICE

CROSS-REFERENCE TO RELATED APPLICATION(S)

The present application claims priority to and incorporates by reference the entire contents of Japanese Patent Application No. 2018-174511 filed in Japan on Sep. 19, 2018.

BACKGROUND OF THE INVENTION

1. Field of the Invention

The present invention relates to a planar lighting device.

2. Description of the Related Art

Planar lighting devices including a plurality of light sources such as light emitting diodes (LEDs) that are arranged to face an edge surface of a light guide plate have been known. Such planar lighting devices are what is called edge-lit planar lighting devices, and the light sources are arranged in a row at regular intervals along the edge surface. A related-art is described in, for example, Japanese Patent Application Laid-open No. 2015-195110.

Due to recent requirements from industry, light guide plates of some planar lighting devices are formed with holes so that components such as sensors and cameras can be disposed in the planar lighting devices. Forming such holes in the light guide plate creates a non-illuminated region on the planar lighting device. It is desired that the non-illuminated region has an elongated shape to make the planar lighting devices aesthetically pleasing in terms of design. If the light guide plate has an elongated hole extending in a direction intersecting a direction of light emitted by the light sources, the elongated hole blocks the light, resulting in lower brightness at the rear of the elongated hole.

SUMMARY OF THE INVENTION

A planar lighting device according to an embodiment has a light source, a light guide plate, and a light shielding sheet. The light guide plate has an light-incident surface on one edge surface and a light-emitting surface on one main surface. The light guide plate emits light, which is emitted by the light source and entered from the light-incident surface, from the light-emitting surface. The light guide plate further has a plurality of through-holes that are spaced apart from each other in a direction intersecting a direction in which light emitted by the light source enters into the light-incident surface. The through-holes pass through the light guide plate in a thickness direction. The light shielding sheet is disposed so as to cover a portion on the light-emitting surface between adjacent through-holes.

DETAILED DESCRIPTION OF THE PREFERRED EMBODIMENT

The following describes a planar lighting device according to an embodiment of the present invention with reference to the accompanying drawings. The embodiment described below is not intended to limit the scope of the present invention. The accompanying drawings are schematically illustrated, and thus, it should be noted that the relation between dimensions of components or the dimensional ratio of one component to another may differ from the actual ones. The dimensional relations or ratios may vary between the accompanying drawings.

Figure 1:
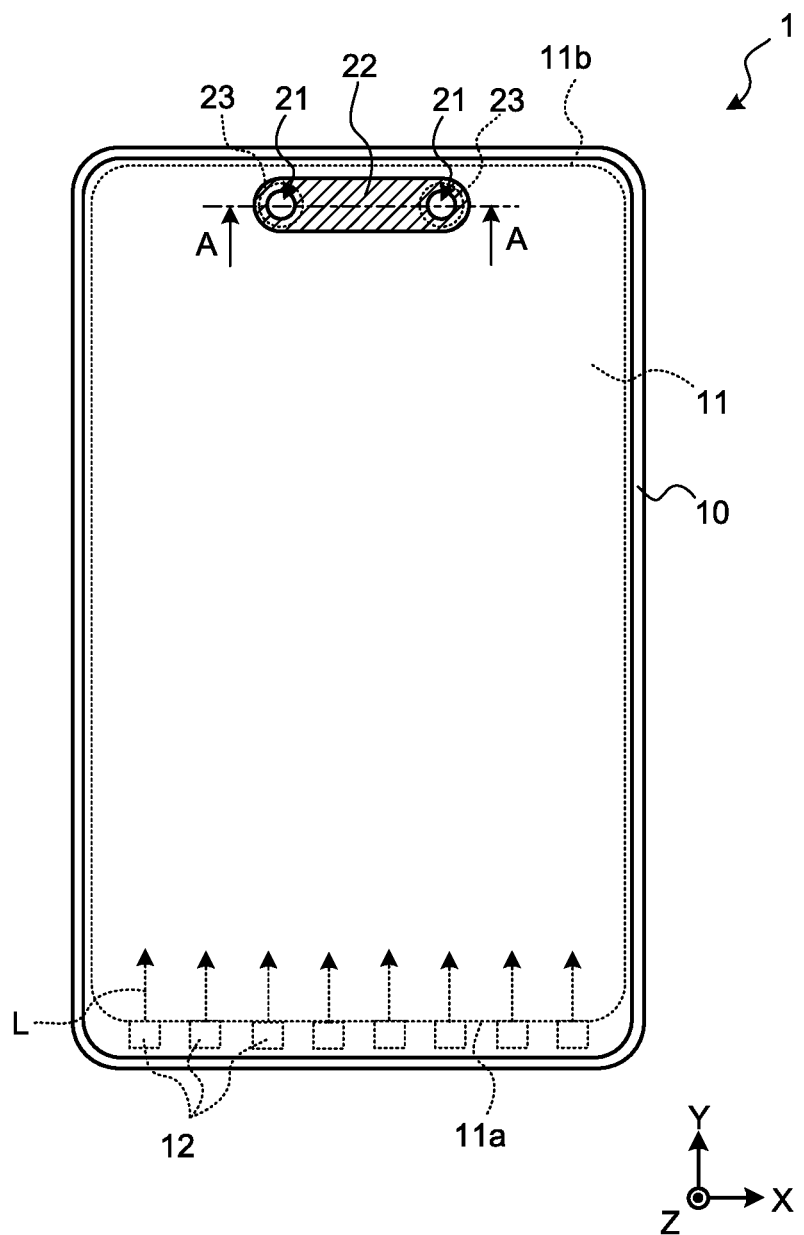
FIG. 1 is a top view of a planar lighting device according to an embodiment of the present invention.
Figure 2:
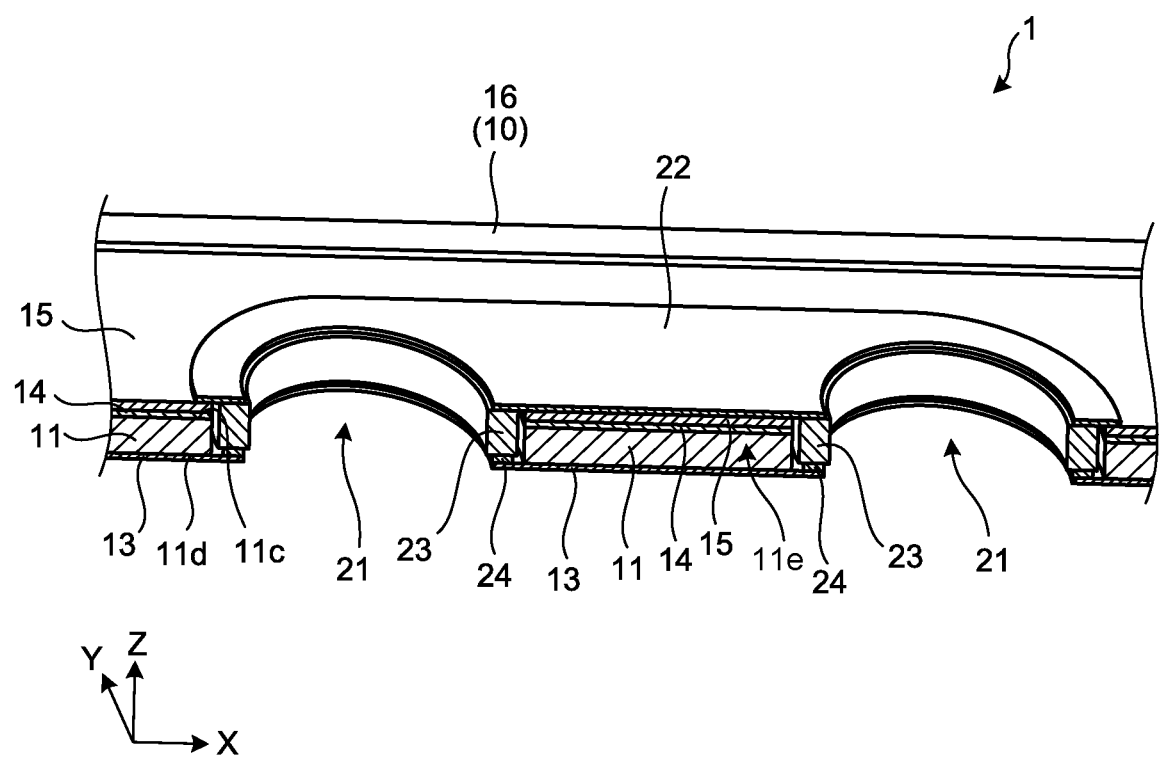
FIG. 2 is a sectional perspective view taken along line A-A in FIG. 1.

A configuration of a planar lighting device 1 according to the embodiment will be described with reference to FIGS. 1 and 2. FIG. 1 is a top view of the planar lighting device 1 according to the embodiment and FIG. 2 is a sectional perspective view taken along line A-A in FIG. 1. For ease of discussion, FIG. 1 and some other drawings include a three-dimensional orthogonal coordinate system including a Z-axis. A direction in which the planar lighting device 1 emits light is defined as a positive direction of the Z-axis.

The planar lighting device 1 according to the embodiment is used as a backlight of a liquid crystal display device. The liquid crystal display device is used in, for example, a smartphone.

As illustrated in FIGS. 1 and 2, the planar lighting device 1 according to the embodiment includes a frame 10, a light guide plate 11, a plurality of light sources 12, a reflective sheet 13, a diffusion sheet 14, a prism sheet 15, and a light shielding sheet 16.

The light guide plate 11 has a plurality of through-holes 21, around which a light shielding sheet 22, a plurality of rings 23, and fixing members 24 are disposed.

The frame 10 is, for example, a frame member made of material not transmitting light, such as metal or resin. The frame 10 accommodates the light guide plate 11, the light sources 12, the reflective sheet 13, the diffusion sheet 14, the prism sheet 15, the light shielding sheet 22, the rings 23, and the fixing members 24.

The light guide plate 11 is a flat plate member made of transparent material such as polycarbonate resin. The light guide plate 11 is made by, for example, injection molding by which resin material is injected into a mold. The light guide plate 11 has edge surfaces 11a and 11b and main surfaces 11c and 11d.

The edge surface 11a illustrated in FIG. 1 crosses the two main surfaces 11c and 11d and from which light emitted by the light sources 12 enters. The edge surface 11a may be hereinafter referred to as a light-incident surface 11a. The edge surface 11b is opposite to the light incident surface 11a.

The main surface 11c illustrated in FIG. 2 emits light that has entered from the light-incident surface 11a. The main surface 11c may be hereinafter referred to as a light-emitting surface 11c. The main surface 11d is opposite to the light-emitting surface 11c and may be hereinafter referred to as a bottom surface 11d.

At least one of the bottom surface 11d and the light-emitting surface 11c is formed with a plurality of dots (not illustrated). The dots are formed to change, as appropriate, the optical path of the light that has entered from the light incident surface 11a. In the present embodiment, the dots are formed more densely at a region close to the edge surface 11b than a region close to the light-incident surface 11a. This configuration enables the entire light-emitting surface 11c to emit light substantially uniformly.

The light sources 12 illustrated in FIG. 1 are, for example, LEDs having light-emitting surfaces (not illustrated) facing the light-incident surface 11a of the light guide plate 11. The light sources 12 emit light L from the light-emitting surfaces in the positive direction of a Y-axis to the light-incident surface 11a. As illustrated in FIG. 1, the light sources 12 are arranged at certain intervals in an X-axis direction along the light-incident surface 11a of the light guide plate 11. The light sources 12 do not necessarily have to be arranged at equal intervals, but may be arranged at unequal intervals.

The reflective sheet 13 illustrated in FIG. 2 faces the bottom surface 11d of the light guide plate 11 and reflects light leaking from the bottom surface 11d of the light guide plate 11 back to the light guide plate 11. The diffusion sheet 14 faces the light-emitting surface 11c of the light guide plate 11 and diffuses light emitted by the light-emitting surface 11c of the light guide plate 11.

The prism sheet 15 is laminated on the diffusion sheet 14, and performs light distribution control on the light diffused by the diffusion sheet 14 and emits the distribution-controlled light. The light shielding sheet 16 is disposed so as to cover a surface of the frame 10 located in the light-emitting direction.

The through-holes 21 pass through the light guide plate 11 in the thickness direction (in the Z-axis direction in the embodiment) and are spaced apart from each other in a direction (in the X-axis direction in the embodiment) that intersects the direction in which the light L emitted by the light sources 12 enters the light guide plate 11. The through-holes 21, for example, are disposed adjacent to the edge surface 11b of the light guide plate 11 and arranged along the edge surface 11b.

In the through-holes 21, some smartphone components such as sensors (e.g., infrared sensor) and cameras are inserted. For example, an infrared sensor is inserted in the separated through-holes 21 such that a transmitter of the infrared sensor is inserted in one of the through-holes 21 and a receiver thereof is inserted in another through-hole 21, and the infrared sensor can work properly.

The planar lighting device 1 according to the embodiment has the through-holes 21 and thus the portions corresponding to the through-holes 21 are not illuminated. If the planar lighting device 1 has a single elongated through-hole-like portion as if the through-holes 21 were integrated a single non-illuminated circular portion, the configuration with a single elongated through-hole-like portion can make the planar lighting device 1, or a display device including the planar lighting device 1 as the backlight, more aesthetically pleasing in terms of design.

However, if the light guide plate 11 has a single elongated hole that actually integrates the through-holes 21, the elongated hole blocks light emitted by the light sources 12 and reduces brightness of the light guide plate 11 at the rear side of the elongated hole, or more specifically, at a region between the elongated hole and the edge surface 11b, which is opposite to the light-incident surface 11a.

In the present embodiment, the light guide plate 11 has a single elongated circular-shape portion covered with the light shielding sheet 22 to make the portion seemingly unilluminated, instead of being provided with an actual single elongated hole by integrating a plurality of through-holes 21. Specifically, the light shielding sheet 22 covers a portion 11e between the adjacent through-holes 21 on the light-emitting surface 11c of the light guide plate.

In this regard, the light L emitted by the light sources 12 can pass through the region between the through-holes 21 in the light guide plate 11, since no actual elongated hole is formed in the light guide plate 11. This configuration can keep the brightness of the entire light guide plate 11 properly including the region at the rear of the elongated circular portion.

Providing the light shielding sheet 22 can create a seemingly unilluminated portion having an elongated circular shape as if the through-holes 21 were integrated. This structure can make the planar lighting device 1 aesthetically pleasing in terms of design. In other words, this structure enables the planar lighting device 1 according to the embodiment to include components therein while keeping proper brightness of the planar lighting device 1 with an aesthetically pleasing design. The shape of the light shielding sheet 22 is not limited to a rectangular shape with two semi-circles at the opposite ends as illustrated in the embodiment. The light shielding sheet 22 may have straight end segments or may have a curved longer side, for example.

In the embodiment, the through-holes 21 are disposed adjacent to the edge surface 11b of the light guide plate 11. This configuration can reduce a frame portion defining the light-emitting region, thereby providing a narrower frame of the planar lighting device 1.

In the embodiment, the through-holes 21 have a circular shape. If the through-holes 21 has a shape with corners instead of a circular shape, light traveling in the light guide plate 11 is reflected irregularly from the corners, which may make the corners unnecessarily bright.

In the present embodiment, however, the through-holes 21 have a circular shape with no corners and this structure can prevent partial bright portions around the through-holes 21 in the light guide plate 11.

In the embodiment, the rings 23 are disposed so as to cover the inner walls of the through-holes 21 to prevent light leakage from the periphery of the through-holes 21. For example, the rings 23 are made of a material that does not transmit light, in the same manner as the frame 10. Providing the rings 23 can prevent light leakage from the periphery of the through-holes 21.

The rings 23 are, for example, fixed to the reflective sheet 13 with a fixing member 24 such as a double-sided adhesive tape. The rings 23 are not necessarily fixed to the reflective sheet 13 but may be fixed to any nearby components by any method.

As described above, the bottom surface 11d of the light guide plate 11 according to the embodiment is formed with dots (optical-path changing means) to change the direction of light that has entered from the light incident surface 11a to the light-emitting direction. On the other hand, in the embodiment, it is preferred that a portion between the adjacent through-holes 21 has no dots formed therebetween, the portion being formed on the bottom surface 11d.

If dots are formed on the portion of the bottom surface 11d between the adjacent through-holes 21, the dots change the direction of light to the light-emitting direction but the light is blocked by the light shielding sheet 22 and thereby wasted.

In the present embodiment, dots are not formed on the portion of the bottom surface 11d between the adjacent through-holes 21. This configuration can introduce more light to the rear side of the elongated circular portion. In this regard, the entire region of the light guide plate 11 including the region at the rear side of the elongated circular portion can be brighter.

In some embodiments, the dots may be formed on the light-emitting surface 11c of the light guide plate 11 as the optical-path changing means. In this case also, it is preferred that a portion between the adjacent through-holes 21 has no dots formed therebetween, the portion being of the light-emitting surface 11c.

Since this configuration can introduce more light to the rear side of the elongated circular portion, the entire region of the light guide plate 11 including the region at the rear side of the elongated circular portion can be brighter.

Figure 3:
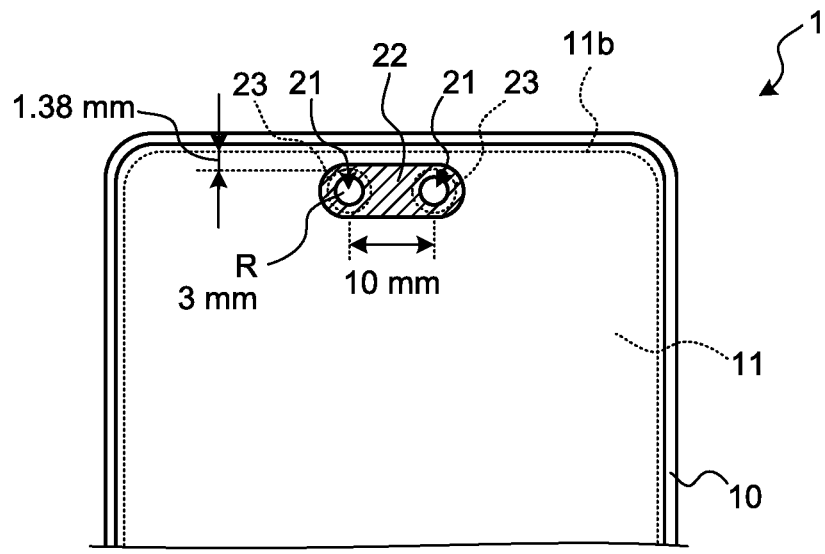
FIG. 3 is an enlarged top view of a planar lighting device according to a first example.
Figure 3:
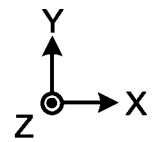
Figure 4:
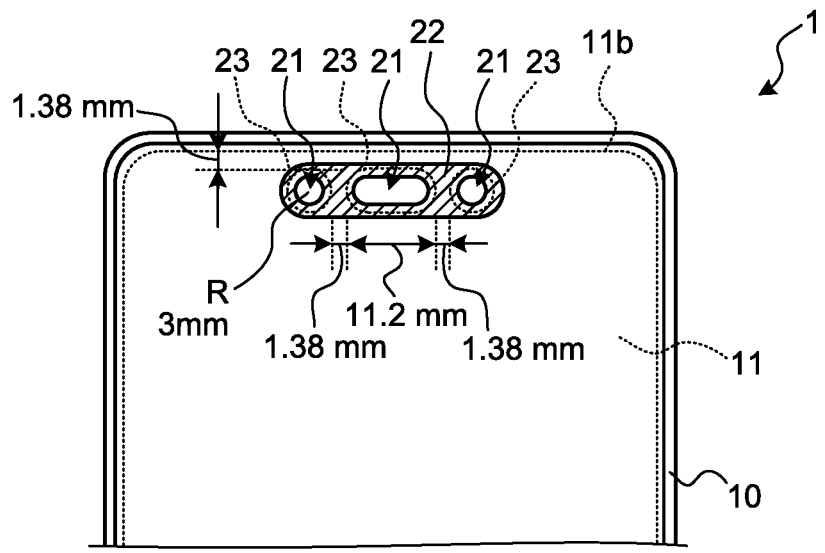
FIG. 4 is an enlarged top view of a planar lighting device according to a second example.
Figure 4:
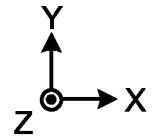
Figures 5, 6:
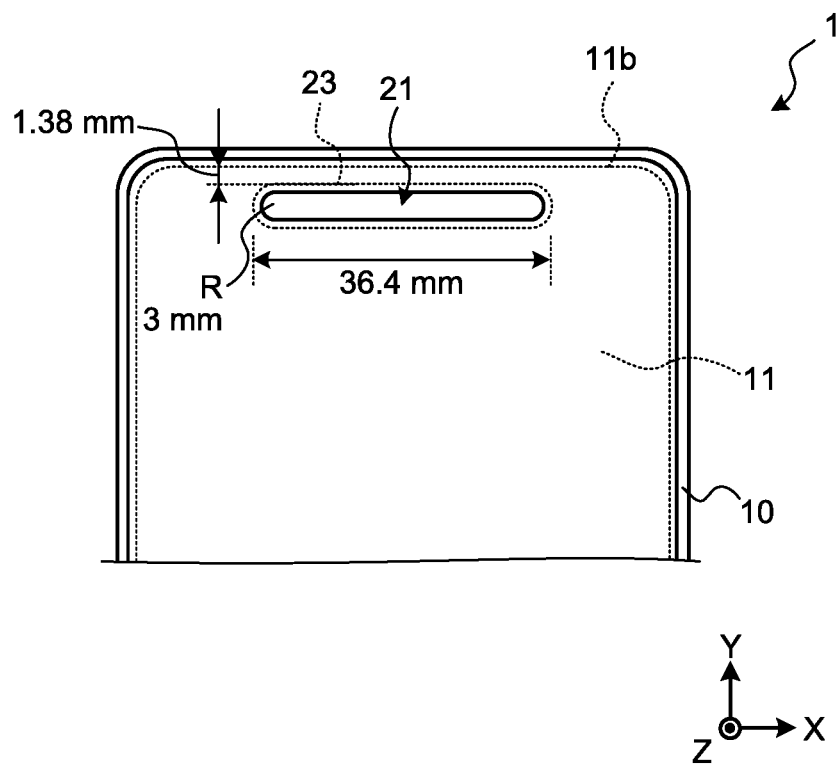
FIG. 5 is an enlarged top view of a planar lighting device according to a reference example.
FIG. 6 is a table illustrating evaluation results of the first example, the second example, and the reference example regarding mean brightness and hole-rear-side brightness.

Described next is a difference between a light guide plate 11 having a plurality of separated through-holes 21 and a light guide plate 11 having a single elongated through-hole 21. Specifically, the following three cases are compared. The first case, which is hereinafter referred to as a "first example", is a light guide plate 11 having two through-holes 21 as illustrated in FIG. 3. The second case, which is hereinafter referred to as a "second example", is a light guide plate 11 having three through-holes 21 arranged in a row as illustrated in FIG. 4. The third case, which is hereinafter referred to as a "reference example", is a light guide plate 11 having a single elongated through-hole 21 as illustrated in FIG. 5.

As illustrated in FIG. 3, the light guide plate 11 according to the first example has two circular through-holes 21 each having a radius of 3 mm. The respective centers of the two through-holes 21 are spaced apart by 10 mm. The through-holes 21 are spaced apart from the edge surface 11b of the light guide plate 11 by 1.38 mm.

In the first example, the light shielding sheet 22 is disposed so as to cover the portion of the light-emitting surface 11c (see FIG. 2) of the light guide plate 11 between the adjacent two through-holes 21. This structure can create a seemingly unilluminated portion having an elongated circular shape as if the two through-holes 21 were integrated.

As illustrated in FIG. 4, the light guide plate 11 according to the second example has two circular through-holes 21 each having a radius of 3 mm and has another through-hole 21 between the two through-holes 21. The other through-hole 21 has a radius of 3 mm and a length of 11.2 mm. This center through-hole 21 is spaced apart from the side through-holes 21 by 1.38 mm. The three through-holes 21 are spaced apart from the edge surface 11b of the light guide plate 11 by 1.38 mm.

In the second example, the light shielding sheet 22 is disposed so as to cover the portions of the light-emitting surface 11c (see FIG. 2) of the light guide plate 11 between the adjacent through-holes 21. This structure can create a seemingly unilluminated portion having an elongated circular shape as if the three through-holes 21 were integrated.

As illustrated in FIG. 5, the light guide plate 11 according to the reference example has a single elongated through-hole 21 having a radius of 3 mm and a length of 36.4 mm. The elongated through-hole 21 is spaced apart from the edge surface 11b of the light guide plate 11 by 1.38 mm.

Planar lighting devices 1 having one or more through-holes 21 according to the first example, the second example, and the reference example were evaluated for the mean brightness and the brightness at the rear side of the elongated circular portion. The mean brightness was measured on the condition that the light-emitting surface 11c of the light guide plate 11 was uniformly illuminated. Specifically, the brightness at the rear side of the elongated circular portion is the brightness of a region between the elongated circular portion and the edge surface 11b, and is hereinafter referred to as hole-rear-side brightness.

To evaluate the planar lighting devices 1, the dots formed on the bottom surface 11d were optimally distributed so that the mean brightness of the entire light-emitting surface 11c of the light guide plate 11 and the hole-rear-side brightness would be as equal as possible. The evaluation results are illustrated in FIG. 6.

The values of the mean brightness in FIG. 6 are relative values with the value of the reference example being 100 and the values of the hole-rear-side brightness indicate a percentage relative to the mean brightness of each example taken as 100(%).

As illustrated in FIG. 6, the planar lighting device 1 having a single elongated through-hole 21 according to the reference example fails to provide uniform brightness between the hole-rear-side brightness and the mean brightness of the entire light-emitting surface 11c even if the dots are optimally distributed. This is because the elongated hole blocks the light L emitted by the light sources 12.

On the other hand, the planar lighting devices 1 having a plurality of separated through-holes 21 according to the first and second examples can provide uniform brightness between the hole-rear-side brightness and the mean brightness of the entire light-emitting surface 11c by optimally distributing the dots. This is because the light L emitted by the light sources 12 passes through the regions between the through-holes 21.

To increase the hole-rear-side brightness of the planar lighting device 1 according to the reference example, the dots need to be distributed, with the highest priority, to introduce more light to the rear side of the elongated through-hole 21. This situation makes it difficult to increase the mean brightness of the entire light-emitting surface 11c. On the other hand, the planar lighting devices 1 according to the first and second examples can provide uniform brightness between the hole-rear-side brightness easily, and thus, can increase the mean brightness of the entire light-emitting surface 11c.

As illustrated in the second example, the planar lighting device 1 having three or more through-holes 21 arranged in a row can include many smartphone components such as sensors and cameras that are inserted in the through-holes 21.

Although the embodiment of the present invention has been described above, the embodiment is not intended to limit the scope of the present invention and various modifications can be made without departing from the spirit and scope of the present invention. The planar lighting device 1 according to the embodiment above, for example, has two or three through-holes 21, but may have four or more through-holes 21 arranged in a row.

As described above, the planar lighting device 1 according to the embodiment includes the light sources 12, the light guide plate 11, and the light shielding sheet 22. The light guide plate 11 has an light-incident surface on one edge surface and a light-emitting surface on one main surface. The light guide plate emits light, which is emitted by the light source and entered from the light-incident surface, from the light-emitting surface. The light guide plate further has a plurality of through-holes 21 that are spaced apart from each other in a direction intersecting a direction in which light L emitted by the light sources 12 enters the light guide plate 11. The through-holes 21 pass through the light guide plate 11 in a thickness direction. The light shielding sheet 22 is disposed so as to cover a portion of the light-emitting surface 11c between the adjacent through-holes 21. This structure enables the planar lighting device 1 to include components therein while keeping proper brightness of the planar lighting device 1 with an aesthetically pleasing design in accordance with the shape of the light shielding sheet 22.

The through-holes 21 of the planar lighting device 1 according to the embodiment are disposed adjacent to the edge surface 11b opposite to the light incident surface 11a. This configuration can reduce the frame portion defining the light-emitting region, thereby providing a narrower frame of the planar lighting device 1.

The through-holes 21 of planar lighting device 1 according to the embodiment have a circular shape. Providing circular through-holes 21 can prevent partial bright portions around the through-holes 21 in the light guide plate 11.

The planar lighting device 1 according to the embodiment further includes the rings 23 disposed so as to cover the inner walls of the through-holes 21. Providing the rings 23 can prevent light leakage from the periphery of the through-holes 21.

In the planar lighting device 1 according to the embodiment, at least one of the light-emitting surface 11c and the main surface (bottom surface 11d) opposite to the light-emitting surface 11c of the light guide plate 11 is formed with dots. A portion between the adjacent through-holes 21 has no dots formed therebetween, the portion being of the surface on which the dots are formed. This configuration can further increase the brightness of the light guide plate 11.

The light guide plate 11 of the planar lighting device 1 according to the embodiment has three or more through-holes 21 that are arranged in a row. This structure allows the planar lighting device 1 to include many smartphone components such as sensors and cameras that are inserted in the through-holes 21.

The planar lighting device according to an embodiment of the present invention has an aesthetically pleasing non-illuminated region in which a plurality of components can be disposed while preventing reduction in brightness of the planar lighting device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar lighting device comprising:
a light source;
a light guide plate having a light-incident surface on one edge surface thereof and a light-emitting surface on one main surface thereof, the light guide plate emitting light, which light is emitted by the light source and entered from the light-incident surface, the light guide plate further having a plurality of through-holes that are spaced apart from each other along a direction intersecting a direction in which light emitted by the light source enters the light guide plate, the through-holes passing through the light guide plate along a thickness direction;
a light reflective sheet disposed on a bottom surface of the light guide plate opposite the light-emitting surface; and
a light shielding sheet disposed on the light-emitting surface so as to cover a portion continuously from one of the through-holes to another of the through-holes on the light-emitting surface.

2. The planar lighting device according to claim 1, wherein the through-holes are disposed adjacent to another edge surface opposite to the light incident surface.

3. The planar lighting device according to claim 1, wherein the through-holes have a circular shape.

4. The planar lighting device according to claim 1, further comprising rings disposed so as to cover inner walls of the through-holes.

5. The planar lighting device according to claim 1, wherein
at least one of the light-emitting surface and another main surface opposite to the light-emitting surface of the light guide plate is formed with dots, and
a portion between the adjacent through-holes has no dots formed therebetween, the portion being of the surface on which the dots are formed.

6. The planar lighting device according to claim 1, wherein three or more through-holes are arranged in a row on the light guide plate.

7. A planar lighting device comprising:
a light source;
a light guide plate having a light-incident surface on one edge surface thereof and a light-emitting surface on one main surface thereof, the light guide plate emitting light, which light is emitted by the light source and entered from the light-incident surface, the light guide plate further having a plurality of through-holes that are spaced apart from each other along a direction intersecting a direction in which light emitted by the light source enters the light guide plate, the through-holes passing through the light guide plate along a thickness direction; and
a light shielding sheet disposed so as to cover a portion on the light-emitting surface between adjacent through-holes, wherein
at least one of the light-emitting surface and another main surface opposite to the light-emitting surface of the light guide plate is formed with dots, and
a portion between the adjacent through-holes has no dots formed therebetween, the portion being of the surface on which the dots are formed.

* * * * *